2 Sheets—Sheet 1.

H. MILLER.

Assignor by mesne assignments to the Combined Patents Can Co.

SHEET-METAL CANS.

No. 7,682. Reissued May 15, 1877.

Attest.
Geo. H. Evans.
J. H. Harrah,

Inventor:
Herman Miller

2 Sheets—Sheet 2.

H. MILLER.

Assignor by mesne assignments to the Combined Patents Can Co.

SHEET-METAL CANS.

No. 7,682. Reissued May 15, 1877.

Attest:
Geo. H. Evans.
J. H. Harrah,

Inventor:
Herman Miller

BEST AVAILABLE COPY

UNITED STATES PATENT OFFICE.

HERMAN MILLER, OF NEW YORK, N. Y., ASSIGNOR, BY MESNE ASSIGNMENTS, TO THE COMBINED PATENTS CAN COMPANY, OF NEW YORK.

IMPROVEMENT IN SHEET-METAL CANS.

Specification forming part of Letters Patent No. 38,974, dated June 23, 1863; reissue No. 7,682, dated May 15, 1877; application filed March 30, 1877.

*To all whom it may concern:*

Be it known that I, HERMAN MILLER, of the city, county, and State of New York, have invented a new and useful Improvement in Cans and other vessels of sheet metal; and I do hereby declare that the following is a full, clear, and exact description of the same, reference being had to the accompanying drawings, forming part of this specification, in which—

Figure 1:
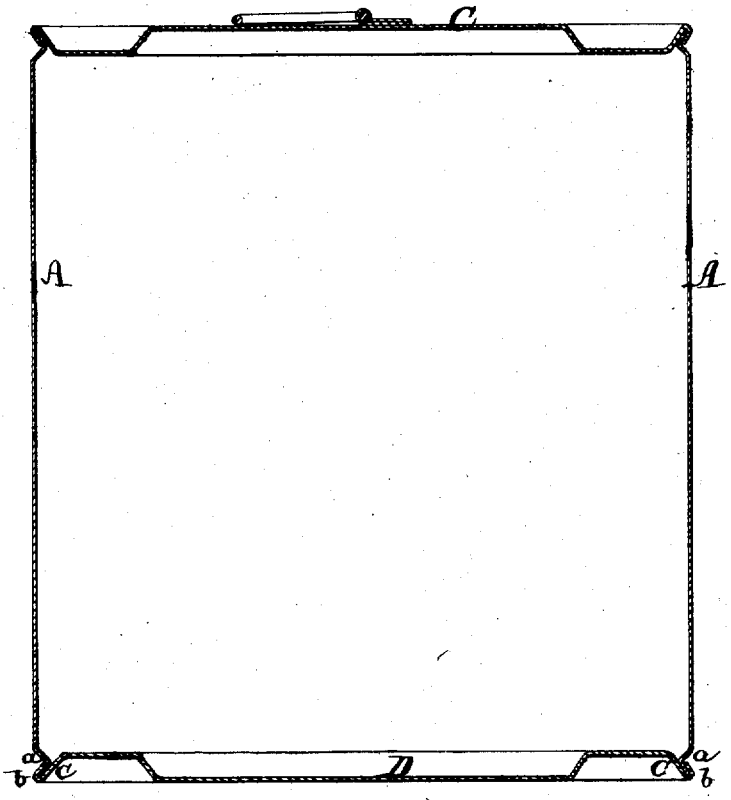
Figure 4:
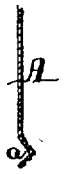
Figure 5:
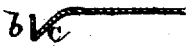
Figure 2:
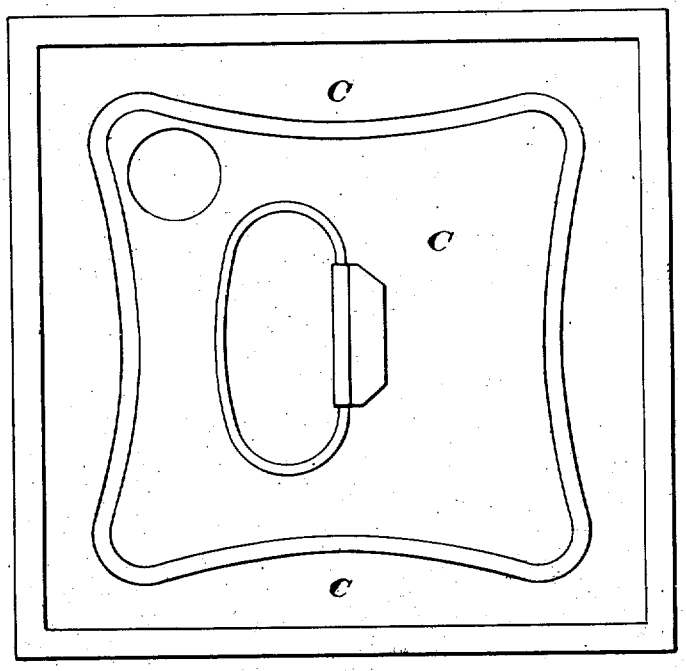
Figure 3:
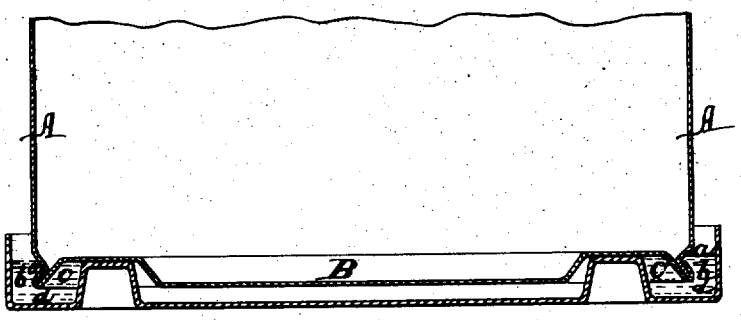

Figure 1 is a vertical section of a can constructed according to my invention. Fig. 2 is a top view of the same. Fig. 3 is a vertical section of the lower part of the can, and of a pan containing melted solder, illustrating the mode of soldering on the bottom. Fig. 4 is a vertical section of the lower part of the side of the can. Fig. 5 is a vertical section of the marginal portion of the bottom, showing its form before it is put on.

Similar letters of reference indicate corresponding parts in the several figures.

This invention relates to cans, pails, and other vessels made of tin-plate or other sheet metal with soldered joints. Its object is twofold, viz: First, to obtain such strength and stiffness at the junction of the sides with the top and bottom that they will not be easily bruised; and, secondly, to provide for the soldering on of the top and bottom by dipping the joint into a vessel containing melted solder, whereby the operation of soldering is not only enabled to be performed more quickly than in the usual way by a soldering-iron, but with a much smaller quantity of solder; and it consists in forming the junction or union between the sides and the top and bottom of the vessel by means of the double-recessed clamping lap-joint hereinafter described.

A A are the sides, B the bottom, and C the top, of the can.

The sides A A have angular grooves or recesses *a a*, Figs. 1, 3, and 4, formed all along their exteriors immediately above the lower and below the upper edges, the inner angles or backs of the said recesses being at about a quarter of an inch above the lower and below the upper edges.

The top and bottom plates B and C are made as much longer than the intended size of the top and bottom of the can as is necessary to form all round them a single lap, *b*, of a depth to lap over the upper and lower edges of the sides A A, as far, or nearly as far, as the inner angles of the recesses *a a*; but the lapping portions *b b*, before the top and bottom plates are put on, are only turned up at a right angle, as shown in Fig. 5; and within the said lapping portions there are formed in the said plates B and C wide recesses *c c*, of which the portions immediately inside of the laps *b b* are inclined to fit to the inclined marginal surfaces which are produced in the interiors of the sides A A by the angular formation of the recesses *a a*.

The sides and the top and bottom plates having been formed as above described, the top and bottom are put on, and the laps *b b* are turned inward over the upper and lower edges of the sides A A, with a suitable tool; and the said laps and the recessed portions of the top and bottom plates immediately within the laps are clamped tightly upon the inner and outer surfaces of the marginal portions of the top and bottom, in such manner (shown in Figs. 1 and 3) as to make a nearly tight joint, which will require very little solder to complete it.

The soldering is performed by dipping the joint into a pan, D, Fig. 3, of melted solder, such pan being so formed as to contain the solder in a narrow channel, *d*, which is not much wider than is necessary to receive the joint, and which prevents any other portion of the bottom but that in immediate proximity to the joint from touching the solder; and in this way the joint is formed with the least possible quantity of solder, much less than would be required in the use of a soldering-iron in the common way of soldering tin-ware.

An important feature of this joint is that it does not project either laterally beyond the sides or vertically beyond the top or bottom of the vessel, and consequently does not interfere with the packing together of a number of vessels.

The drawing represents the application of

BEST AVAILABLE COPY my invention to a can of square form; but it is applicable with equal advantage to cans or pails of circular or other form.

What I claim as my invention, and desire to secure by Letters Patent, is—

1. A can or other vessel made of sheet metal, in which the top or bottom is joined to the sides by a double-recessed clamping lap-joint, substantially as described.

2. A can or other vessel made of sheet metal, in which the top or bottom is joined to the sides by a clamping lap-joint, which is capable of being soldered by dipping, substantially as described.

HERMAN MILLER.

Witnesses:

GEO. H. EVANS,

T. H. HARRAH.